(12) United States Patent
Simonson et al.

(10) Patent No.: US 10,221,918 B2
(45) Date of Patent: Mar. 5, 2019

(54) ROPE TENSION DEVICE AND METHOD THEREOF

(71) Applicant: Dark Canyon, Inc., Cottonwood Heights, UT (US)

(72) Inventors: Eric M. Simonson, Salt Lake City, UT (US); E. Roger Simonson, Salt Lake City, UT (US)

(*) Notice: Subject to any disclaimer, the term of this patent is extended or adjusted under 35 U.S.C. 154(b) by 291 days.

(21) Appl. No.: 15/193,557

(22) Filed: Jun. 27, 2016

(65) Prior Publication Data

US 2016/0377150 A1    Dec. 29, 2016

Related U.S. Application Data

(60) Provisional application No. 62/185,577, filed on Jun. 27, 2015.

(51) Int. Cl.
*F16G 11/06* (2006.01)
*F16G 11/10* (2006.01)

(52) U.S. Cl.
CPC ................. *F16G 11/106* (2013.01)

(58) Field of Classification Search
CPC ......... B66D 5/20; F16G 11/04; F16G 11/103; F16G 11/106
USPC ....................................................... 254/391
See application file for complete search history.

(56) References Cited

U.S. PATENT DOCUMENTS

| | | |
|---|---|---|
| 3,440 A | 2/1844 | Hatch |
| 12,086 A | 12/1854 | Muhle |
| 48,610 A | 7/1865 | White |
| 52,154 A | 1/1866 | Frye |
| 64,693 A | 5/1867 | Ogier |
| 163,195 A | 5/1875 | Hester |
| 223,556 A | 1/1880 | Thayer |
| 292,934 A | 2/1884 | Menzel |
| 342,110 A | 5/1886 | Kjellstrom |
| 350,226 A | 10/1886 | Youmans |
| 379,078 A | 3/1888 | Parker |
| 416,985 A | 12/1889 | Beattie |
| 906,391 A | 12/1908 | Dickson et al. |

(Continued)

FOREIGN PATENT DOCUMENTS

| | | |
|---|---|---|
| DE | 3043432 | 6/1982 |
| DE | 29701473 | 3/1997 |

(Continued)

*Primary Examiner* — Emmanuel M Marcelo

(74) *Attorney, Agent, or Firm* — David L. Stott

(57) ABSTRACT

Embodiments of a rope tension device for cinching a load with a rope are disclosed. The rope tension device includes a frame and brake member. The frame includes a first rail and a second rail with a bracing structure extending between the first rail and the second rail such that the bracing structure defines an arcuate surface. The brake member is pivotably coupled to the frame. Further, the brake member defines a brake surface such that the brake surface is biased with a spring member toward the arcuate surface, the brake surface defining an axially extending concave feature that faces the arcuate surface of the bracing structure. With this arrangement, a gap defined between the arcuate surface and the axially extending concave feature varies in height along an axial width defined between the first and second rails so as to receive the rope within the gap for cinching the load.

34 Claims, 3 Drawing Sheets

(56) References Cited

U.S. PATENT DOCUMENTS

| | | | |
|---|---|---|---|
| 913,469 A | 2/1909 | Cleveland | |
| 950,434 A | 2/1910 | Carlson | |
| 1,257,028 A | 2/1918 | Ryther | |
| 2,622,293 A | 12/1952 | Wermlinger | |
| 2,653,365 A | 9/1953 | Elsner | |
| D188,897 S | 9/1960 | Prete, Jr. | |
| 3,091,830 A | 6/1963 | Harley | |
| 3,134,153 A | 5/1964 | Harley | |
| 3,253,309 A | 5/1966 | Baresch | |
| 3,413,691 A | 12/1968 | Elsner | |
| 3,678,542 A | 7/1972 | Prete, Jr. | |
| 3,686,715 A | 8/1972 | Brodnicki | |
| 3,872,550 A | 3/1975 | Yang | |
| 4,097,023 A | 6/1978 | Muller | |
| 4,125,115 A | 11/1978 | Mayo et al. | |
| 4,130,949 A | 12/1978 | Seidel | |
| 4,136,422 A | 1/1979 | Ivanov et al. | |
| 4,398,680 A | 8/1983 | Ogawa et al. | |
| D274,861 S | 7/1984 | Lindblad | |
| 4,464,811 A | 8/1984 | Holmes | |
| 4,521,000 A * | 6/1985 | Dodge, Jr. | A62B 35/0087 254/391 |
| D283,369 S | 4/1986 | Martin | |
| 4,717,088 A | 1/1988 | Fohl | |
| 4,727,628 A | 3/1988 | Rudholm | |
| 4,728,138 A * | 3/1988 | Samuelsson | B66D 3/10 254/391 |
| 4,843,688 A | 7/1989 | Ikeda | |
| D303,232 S | 9/1989 | Lortz et al. | |
| 4,899,423 A * | 2/1990 | Randall | A43C 3/04 114/218 |
| 5,146,655 A * | 9/1992 | Gibbs | A44B 99/00 188/65.2 |
| 5,172,455 A | 12/1992 | Johnson et al. | |
| 5,291,638 A | 3/1994 | Huang | |
| 5,368,281 A * | 11/1994 | Skyba | B25B 25/00 254/217 |
| D362,415 S | 9/1995 | Takimoto | |
| D377,155 S | 1/1997 | Takimoto | |
| 5,664,640 A * | 9/1997 | Smith | A62B 1/14 182/193 |
| 5,673,936 A | 10/1997 | Mondel | |
| 5,809,620 A | 9/1998 | Crowley et al. | |
| 5,845,894 A * | 12/1998 | Petzl | A62B 1/14 254/391 |
| 5,855,251 A * | 1/1999 | Deuer | A62B 1/14 182/192 |
| 5,904,198 A | 5/1999 | Huang | |
| 6,009,977 A * | 1/2000 | Pelofi | A62B 1/14 182/192 |
| 6,081,973 A | 7/2000 | Liu | |
| 6,148,485 A | 11/2000 | Wu | |
| 6,149,133 A * | 11/2000 | Skyba | B66D 1/7415 254/371 |
| 6,412,602 B1 * | 7/2002 | Sundman | A62B 1/14 182/133 |
| 6,685,171 B2 * | 2/2004 | Lob | B66D 3/06 254/391 |
| 6,877,189 B2 | 4/2005 | Simonson et al. | |
| 7,222,840 B1 * | 5/2007 | Stepper | A01K 69/00 254/391 |
| 8,225,905 B2 * | 7/2012 | Delaittre | A62B 1/14 182/190 |
| 9,120,654 B2 * | 9/2015 | Chaumontet | A62B 1/10 |
| 2011/0204306 A1 * | 8/2011 | Kingery | B66D 3/046 254/391 |
| 2014/0034888 A1 * | 2/2014 | Kingery | B66D 3/04 254/391 |

FOREIGN PATENT DOCUMENTS

| | | |
|---|---|---|
| FR | 2378469 | 8/1978 |
| FR | 2484216 | 12/1981 |

* cited by examiner

ROPE TENSION DEVICE AND METHOD THEREOF

CROSS-REFERENCE TO RELATED APPLICATION

The present application claims the benefit of U.S. Provisional Patent Application Ser. No. 62/185,577, filed Jun. 27, 2015, entitled ROPE TENSION DEVICE AND METHOD THEREOF, the disclosure of which is incorporated by reference herein in its entirety.

TECHNICAL FIELD

The present invention relates generally to rope tension devices for placing a tension force to rope and, more particularly to cooperation between a brake surface and a bracing structure of a rope tension device configured to be employed with rope.

BACKGROUND

Various versions of cam buckles have been provided over the years for obtaining a mechanical advantage to increase a tension force in a flat strap with a given pulling force exerted by the operator. Known cam buckles, such as are described in U.S. Pat. No. 6,877,189, for example, generally provide a cam portion spring biased against an opposing structure between which a flat strap may be cinched to hold a tension force in the flat strap. While these versions of cam buckles are effective for flat straps, they are incapable of being effectively employed with lines having a circular cross-section, such as rope. Often rope is the preferred medium for cinching down objects. Various complex rope tension devices have been introduced, but are bulky and/or complex and, therefore, are limited in their applied use and costly to manufacture. For example, rope tension devices employed for clamping to rope are described in U.S. Pat. Nos. 6,092,791 and 6,068,242 both to Kingery, describe effective clamping for tensioning rope, but require multi-faceted structures and complex ratcheting mechanisms.

Therefore, based on the foregoing, it would be advantageous to provide a more compact rope tension device without the complexity of the current rope tensioning devices.

BRIEF SUMMARY OF THE INVENTION

Embodiments of the present invention are directed to various devices, systems and methods of tensioning a rope to a load. For example, in one embodiment, a rope tension device for cinching a load with a rope having a generally circular cross-section is provided. The rope tension device includes a frame and a brake member. The frame includes a first rail and a second rail with a bracing structure extending between the first rail and the second rail such that the bracing structure defines an arcuate surface. The brake member is pivotably coupled to the frame. The brake member includes a brake surface such that the brake surface is biased with a spring member toward the arcuate surface, the brake surface defining an axially extending concave feature that faces the arcuate surface of the bracing structure. With this arrangement, a gap between the arcuate surface and the axially extending concave feature varies in height along an axial width defined between the first rail and the second rail so as to receive the rope within the gap.

In one embodiment, the rope tension device further includes a rope having a generally circular cross-section, the rope configured to extend through the gap between the arcuate surface of the bracing structure and the axially extending concave feature of the brake member. In a further embodiment, the brake surface includes multiple rows of teeth extending therefrom such that more than one row of teeth contact the rope for cinching the load.

In another embodiment, the axially extending concave feature includes an axially extending concave surface. In another embodiment, the axially extending concave feature includes multiple teeth in an axial row such that the axially extending concave feature is defined by an outer-most axial profile of ends of the teeth in the axial row. In still another embodiment, the brake surface includes multiple teeth extending therefrom, the multiple teeth being canted so as to facilitate the rope to readily move in one direction and to substantially prevent movement of the rope in a second direction. In another embodiment, the brake member includes a channel portion for receiving the rope, the channel portion defined by first and second peripheral side walls with the brake surface defined therebetween and teeth extending from the brake surface. In yet another embodiment, the brake surface extends with a radial concave profile between a top end and a bottom end of the brake surface, the radial concave profile defining a radius relative to an axis of the bracing structure.

In another embodiment, the arcuate surface of the bracing structure defines an axial concave surface. In yet another embodiment, the arcuate surface of the bracing structure defines an axial flat surface and a cylindrical structure. In still another embodiment, the arcuate surface includes a textured surface.

In another embodiment, the bracing structure includes a roller member configured to rotate. In still another embodiment, the bracing structure is fixed to the first and second rails of the frame.

In accordance with another embodiment of the present invention, a rope tension device is provided. The rope tension device includes a frame, a bracing structure, and a brake member. The frame includes a first rail and a second rail. The bracing structure is positioned between the first rail and the second rail at an end portion of the frame such that the bracing structure defines an arcuate surface. The brake member is pivotably coupled to the frame. The brake member includes a brake surface such that the brake surface is biased with a spring member toward the arcuate surface of the bracing structure. The brake member includes a channel portion defined by first and second peripheral side walls and the brake surface between the side walls such that the brake surface includes teeth extending therefrom and extending toward the arcuate surface of the bracing structure.

In one embodiment, the rope tension device further includes a rope having a generally circular cross-section, the rope configured to be positioned along the channel portion and between the brake surface and the arcuate surface of the bracing structure. In another embodiment, the brake surface and the arcuate surface define a gap therebetween such that the gap defines a height that varies along an axial width between the first rail and the second rail. In another embodiment, the brake surface includes an axially extending concave feature.

In another embodiment, the arcuate surface of the bracing structure includes an axially extending concave surface. In yet another embodiment, the arcuate surface of the bracing structure includes an axially extending flat surface. In another embodiment, the bracing structure includes a roller member configured to rotate.

In still another embodiment, the brake surface extends with a radial concave profile between an upper end and a lower end of the brake surface. The radial concave profile may define a radius relative to an axis of the bracing structure.

In accordance with another embodiment of the present invention, a method for providing tension in a rope is provided. The method includes steps of: coupling a first portion of a rope to an object; coupling a frame of a rope tension device to the object or another object; extending the rope through a gap defined between a brake member and a bracing structure of the rope tension device such that the gap varies in height along an axial width between first and second rails of the frame, the brake member pivotably coupled to the frame of the rope tension device and biased toward the bracing structure with a spring member; pulling a second portion of the rope with a pulling force from an upper side of the frame to place a tension force on the first portion of the rope extending from a bottom side of the frame; and maintaining the tension force in the first portion of the rope with teeth extending from a brake surface biased against the rope and toward the bracing structure.

In one embodiment, the step of extending the rope through the gap includes extending the rope through the gap such that the brake surface defines an axially extending concave feature. In another embodiment, the step of extending the rope through the gap includes extending the rope through the gap such that the brake member defines a channel portion defined by first and second peripheral side walls with the brake surface therebetween. In another embodiment, the method step of extending the rope through the gap includes extending the rope through the gap such that the bracing structure defines an arcuate surface facing the brake surface, the arcuate surface including at least one of an axially extending concave surface and an axially extending flat surface. In another embodiment, the method step of extending the rope through a gap includes extending the rope through the gap such that the brake surface defines a radial concave profile between a top end and a bottom end of the brake surface, the radial concave profile defining a radius relative to an axis of the bracing structure.

In accordance with another embodiment of the present invention, a rope tension device is provided. The rope tension device includes a frame, a bracing structure and a brake member. The frame includes a first rail and a second rail. The bracing structure is positioned between the first rail and the second rail at an end portion of the frame. The bracing structure defines an arcuate surface. The brake member is pivotably coupled to the frame, the brake member having a brake surface such that the brake surface is biased with a spring member toward the arcuate surface of the bracing structure. The brake surface includes teeth extending therefrom and that extend toward the arcuate surface of the bracing structure. The brake surface defines a concave feature such that a gap between the arcuate surface and the concave feature varies in height along an axial width defined between the first rail and the second rail.

In one embodiment, the brake member includes first and second peripheral side walls extending toward the bracing structure to define a channel portion. In another embodiment, the concave feature of the brake surface includes a radial concave profile defined between the top end and the bottom end of the brake surface, the radial concave profile defined by a radius relative to an axis of the bracing structure. In a further embodiment, the radial concave profile extends axially in a generally linear manner. In another embodiment, the radial concave profile extends axially with an axial concave profile. Further, in another embodiment, the arcuate surface of the bracing structure includes at least one of an axially extending concave surface or an axially extending flat surface.

In another embodiment, the concave feature of the brake surface includes an axially extending concave profile. In another embodiment, the arcuate surface of the bracing structure extends axially with at least one of a concave profile and a flat profile.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
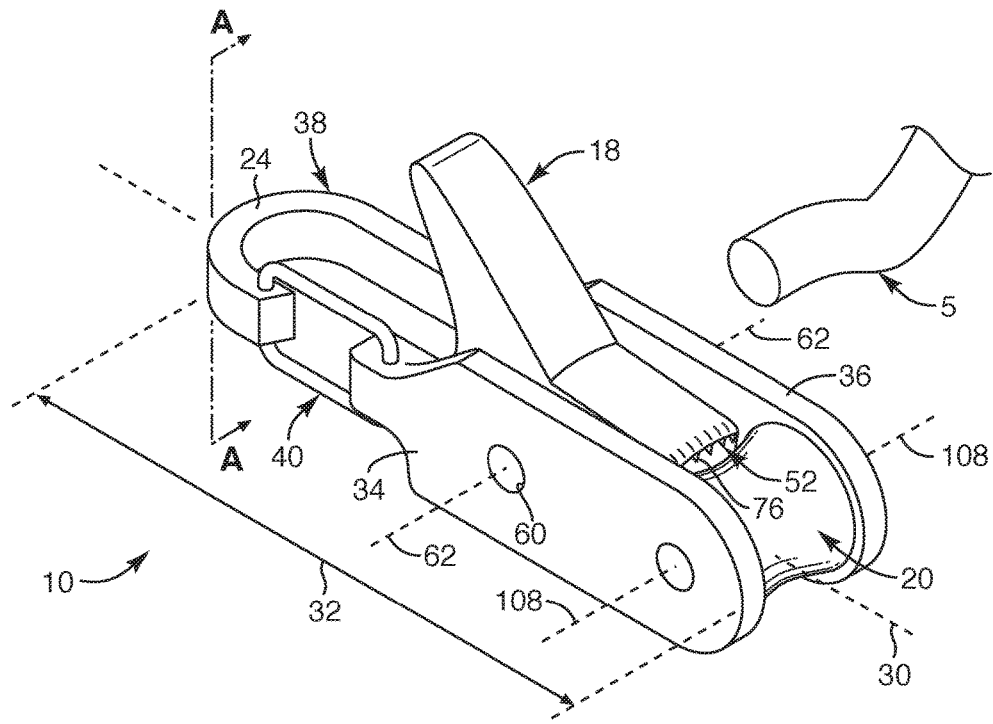
FIG. 1 is a perspective view of a rope tension device, according to an embodiment of the present invention.
Figure 1A:
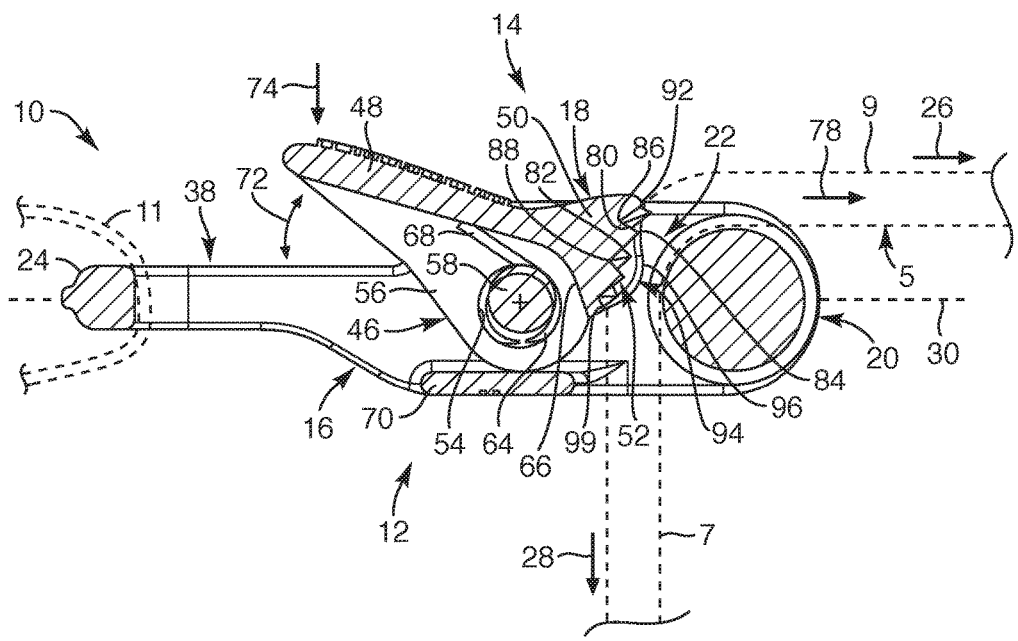
FIG. 1A is a cross-sectional side view of the rope tension device taken along section line A-A of FIG. 1, depicting a rope cinched between a brake member and a bracing structure, according to another embodiment of the present invention.

Referring to FIGS. 1 and 1A, a rope tension device 10 that may be employed for, or associated with, strapping objects down, such as cargo, backpacks, bags, or the like is provided. The rope tension device 10 may also be employed for mountaineering purposes, such as, hiking, backpacking, tents, guy lines, tarps, awnings, or for any other purpose where tensioning a rope is desired. The rope tension device 10 may be sized and configured to be employed with rope 5 having a generally circular cross-section, rather than a flat strap, as disclosed in commonly owned U.S. Pat. No. 6,877,189, the disclosure of which is incorporated herein by reference in its entirety.

The rope 5 that may be employed with the rope tension device 10 may be made from natural and/or synthetic fibers that may be formed by twisting or braiding the fibers together to form a thicker and stronger structure. Such rope 5 may also be woven around a core. The rope 5 may be made from nylon, polypropylene, polyester, polyethylene, or natural fibers, or combinations thereof, or any other suitable material for forming a generally circular cross-sectioned rope. The sizing of the rope employed with the rope tension device 10 may include diameters ranging between about 2-26 millimeters (or up to about one inch), the rope tension device appropriately sized to accommodate particular rope diameters. Rope that is sized with diameters between about 2-10 millimeters are typically referred to as a cord or an accessory cord. As such, rope, as defined herein, may be any cord or line or the like that exhibits a generally circular cross-section. Further, a generally circular cross-section may be defined as a generally semi-circular cross-section or oval cross-section.

In one embodiment, the rope tension device 10 may include a frame 16 with a brake member 18 biased toward a bracing structure 20. The rope tension device 10 may include one or more engagement surfaces between the brake member 18 and the bracing structure 20 sized and configured to receive a portion of rope for clinching thereto to maintain tension in the rope 5, the rope defining a first portion 7 extending from a bottom side 12 of the rope tension device 10 and defining a second portion 9 extending from a top side 14 of the rope tension device 10. For example, the first portion 7 of the rope 5 may be received through a gap 22 between surfaces of the brake member 18 and the bracing structure 20, leaving the first portion 7 of the rope 5 extending from the gap 22 and from the bottom side 12 of the rope tension device 10. The first portion 7 may be coupled, for example, to an object. The rope tension device 10 may also be coupled at its rear end 24 to the same or another object with, for example, a secondary line 11. The rope tension device 10 may be configured such that a pulling force 26 may be applied to the second portion 9 of the rope 5 so that the second portion 9 of the rope may readily be pulled to place a tension force 28 to the first portion 7 of the rope 5. Such tension force 28 may be maintained in the first portion 7 of the rope 5 until the user releases the brake member 18 from the rope 5. In this manner, the rope tension device 10 includes engagement surfaces sized and configured to maintain the tension force 28 in the first portion 7 of the rope 5. Such engagement surfaces in the brake member 18 and the bracing structure 20 will be discussed in more detail herein.

As set forth, the rope tension device 10 includes a frame 16. The frame 16 may be somewhat elongated to define an axis 30 along a length 32 of the frame 16. The frame 16 may be generally u-shaped or oval shaped or any other suitable shape that will facilitate cooperation between the brake member 18 and the bracing structure 20 of the rope tension device 10. For example, the frame 16 may include a first rail 34 and a second rail 36 with the brake member 18 and the bracing structure 20 extending between the first and second rails 34, 36. The first rail 34 may extend generally parallel relative to the second rail 36 with a rear frame portion 38 or rear rail extending between the first and second rails 34, 36. The rear frame portion 38 may include an arcuate portion extending between the first and second rails or may extend linearly therebetween. The first rail 34 may be a first side of the frame 16 and the second rail 36 may be a second side of the frame 16, the first and second rails 34, 36 being opposite sides of the frame 16.

Further, in one embodiment, the rear frame portion 38 may include a pivoting door 40. The pivoting door 40 may be sized and configured to readily facilitate coupling the rope tension device 10 to an object or the secondary line 11, ring, or any other suitable coupling mechanism. The pivoting door 40 may be in the form of a metallic u-shaped member with ends 42 that curl inward. The ends 42 may pivot about one end of, for example, the first rail 34 such that a base 44 of the pivoting door may couple to a recess or channel defined in the rear end portion 38 of the frame 16. Such base 44 may maintain its position within the channel with a snap-type fit or interference type fit. Other suitable means may be utilized to maintain the pivoting door 40 in a closed position, such as, with a magnet or clip, or other temporary locking mechanism. In this manner, the pivoting door 40 may maintain a closed position when desired and be readily moved to an open position upon removing or inserting, for example, the secondary line 11 or coupling to the rope tension device 10.

The brake member 18 may include a base portion 46, a brake release portion 48, and a cam portion 50 with an engaging brake surface 52. The brake release portion 52 may extend at an angle from the cam portion 50 to act as a lever for the brake member 18. The base portion 46 may define a bore 54 that extends between and through side walls 56 of the base portion 46, the side walls 56 configured to extend substantially parallel with the first and second rails 34, 36. The base portion 46 of the brake member 18 may be rotatably coupled to the frame 16 with a shaft 58 or axil. The shaft 58 may be positioned through opposing apertures 60 and/or recesses defined in the first and second rails 34, 36. The shaft 58 may define a shaft axis 62 extending longitudinally along an elongated length of the shaft 58. Further, the shaft 58 and shaft axis 62 may extend perpendicular relative to elongated lengths of the first and second rails 34, 36 and axis 30 or the first and second inside surfaces of the first and second rails 34, 36. With this arrangement, the brake member 18 is configured to be rotatably coupled to the shaft 58 such that the brake member 18 is positioned between the first and second rails 34, 36 of the rope tension device 10.

In one embodiment, the brake member 18 may be biased forward or toward the bracing structure 20 of the rope tension device 10 with a spring member 64. The spring member 64 may be positioned, for example, over the shaft 58 and within a hollow space 66 defined in the underside of the brake member 18 between the side walls 56 of the base portion 46 of the brake member 18. The spring member 64 may include one end 68 biasing against the brake member 18 and a second end (not shown) biasing against the frame 16, such as a cross-member 70 extending along an underside of the frame 16 between the first and second rails 34, 36. With this arrangement, the brake member 18 may be continually biased toward a brake position via the spring member 64 so that the engaging brake surface 52 may be biased against the rope 5. Further, the brake member 18 may pivot or rotate between the brake position and an open position, as indicated by rotational arrow 72. Upon placing a force 74 downward against the brake release portion 48, the brake member 18 may rotate or pivot about the shaft axis 62 to the open position or brake release position (not shown), which pivots the brake member 18 against the biasing force of the spring member 64. By rotating or pivoting the brake member 18 to the open position, the gap 22 may become enlarged or widened between the engaging brake surface 52 and the bracing structure 20 of the rope tension device 10. As such, once in the open position, the first portion 7 of the rope 5 may be either placed in tension or loosened and removed from its tension state. Also, in the open position, the widened gap 22 facilitates ready insertion of the rope 5 therethrough in preparation for tensioning the rope 5 to an object. Further, it should be noted that upon the rope 5 being positioned through the gap 22, the rope 5 may be pulled through the gap 22 without pressing the brake release portion 48 to place the tension force 28 in the first portion 7 of the rope 5.

As previously set forth, the brake member 18 includes the engaging brake surface 52 sized and configured to be biased against a portion of rope 5. As such, the brake surface 52 may face the bracing structure 20 of the rope tension device 10 with the rope 5 configured to be positioned therebetween. Further, the brake surface 52 may include an interface of multiple teeth 76 or spikes extending from the brake surface. This interface of teeth 76 may be sized and configured to grab or provide friction with the rope 5 such that multiple teeth may engage the rope surface. In one embodiment, the teeth 76 or spikes may be oriented or canted so as facilitate the rope 5 to move through the gap in a first direction, as shown by arrow 78, and substantially prevent movement of the rope in the opposite direction through the gap 22 so as to maintain the tension force 28.

In another embodiment, as depicted in the cross-sectional view of FIG. 1A, each spike or tooth 76 may include a first side 80 and a second side 82 each extending from the cam portion 50 at a base end to a point 84 or edge, the first side 80 facing outward and upward and the second side 82 facing outward and downward. Further, a first base end 86 of the first side 80 and a second base end 88 of the second side 82 may define a distance therebetween, the distance being longer than the first and second sides 80, 82. In another embodiment, the teeth may include a distance between respective base ends of a first side and a second side in which the distance may be shorter than both the first side and the second side. In still another embodiment, the teeth may include a distance between base ends of a first side and a second side in which the distance may be longer than one of the first side and the second side.

In another embodiment, the engaging brake surface 52 may include multiple rows and/or columns of teeth 76 or spikes. In one embodiment, the multiple rows and/or columns of teeth 76 or spikes may extend relative to each other in a staggered configuration. In another embodiment, the first side 80 and/or the second side 82 of teeth 76 in one column or row may be longer or shorter than teeth 76 in another column or row. In another embodiment, the point 84 of each tooth 76 defined by the first side 80 extending to the second side 82 may define an edge so as to exhibit a depth.

Figure 2A:
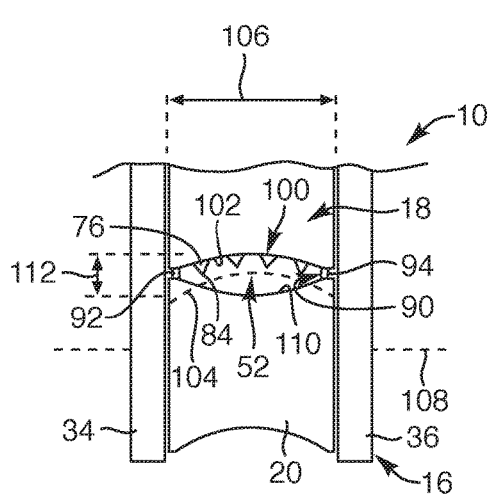
FIG. 2A is a partial top end view of the bracing structure adjacent the brake member of the rope tension device depicted in FIG. 1, depicting the bracing structure being fixed with an axially extending concave surface, according to another embodiment of the present invention.

With respect to FIGS. 1A, and 2A, in one embodiment, the brake surface 52 may define a channel portion 90 defined by a first peripheral side wall 92 and a second peripheral side wall 94, the first and second peripheral side walls 92, 94 extending from the cam portion 50 with the engaging brake surface 52 and teeth 76 therebetween. With this arrangement, the channel portion 90 may be sized and configured to receive and hold the rope 5 extending therethrough. Further, the second peripheral side wall 94 may include an outer edge 96 or lip that may extend with a radius and contour between an upper end 98 and a lower end 99 of the second peripheral side wall 94. Likewise, the first peripheral side wall 92 may extend in a similar manner as the second peripheral side wall 94. Such radius or contour of the second peripheral side wall 94 may extend, from a side view as depicted in FIG. 1A, with an S-configuration or the like. In this manner, the brake surface 52 of the cam portion 50 may define a channel portion 90 sized to hold a portion of rope 5 therein.

With reference to FIGS. 1A and 2A, in another embodiment, the brake surface may define an axial concave feature 100. The axial concave feature 100 or concave configuration may extend axially in a concave manner between the first and second peripheral side walls 92, 94 or the first and second rails 34, 36, as depicted in FIG. 2A. The axial concave feature 100 may extend axially between the first and second peripheral side walls 92, 94 from the upper end 98 to the lower end 99 of the brake surface 52. Such axial concave feature 100 may be sized and configured to maximize engagement of the teeth 76 on the brake surface 52 with a portion of rope 5 positioned between the brake surface 52 and the bracing structure 20 of the rope tension device 10. Further, the axial concave feature 100 of the brake surface 52 may cooperate with a shape of the bracing structure 20 so as to further maximize engagement of a portion of rope between the brake surface 52 and the bracing structure 20 of the rope tension device 10.

In one embodiment, the axial concave feature 100 may be defined by a surface of the cam portion 50 or, otherwise said, an axial concave surface 102 extending along a width 106 of the brake surface 52 with the teeth 76 extending from the axial concave surface 102. In another embodiment, the axial concave feature 100 may be defined by an outer-most axial profile 104 of the points 84 or ends of the teeth 76, as depicted by the dotted line in FIG. 2A. In another embodiment, the axial concave feature 100 may be defined as an axial concave surface 102 and/or the outer-most axial profile 104 of the points 84 or ends of the teeth 76 in combination with the before-described channel portion 90 defined by and extending between the first and second peripheral side walls 92, 94. In another embodiment, the channel portion 90 may include an axially concave feature 100.

With reference to FIGS. 1, 1A and 2A, the bracing structure 20 may extend between the first rail 34 and the second rail 36 of the frame 16. In one embodiment, the bracing structure 20 may be fixed to the first and second rails 34, 36. In another embodiment, the bracing structure 20 may be monolithic relative to the first and second rails 34, 36 of the frame 16. In another embodiment, the bracing structure 20 may include an arcuate surface at least over a portion positioned adjacent the brake surface 52. For example, the bracing structure 20 may include a cylindrical shape or rounded surface with a radius defining a bracing structure axis 108. Further, the bracing structure 20 may extend with a second axially concave surface 110 between the first rail 34 and the second rail 36 with somewhat of an hour-glass shape. With the second axially concave surface 110 of the bracing structure 20, the gap 22 between the brake surface 52 and the bracing structure 20 varies in height 112 along the width 106 between the first rail and the second rail 34, 36. Further, the second axially concave surface 110 of the bracing structure 20 may act as a centering feature so as to manipulate the rope 5 to be substantially centered within the gap 22 and maintained thereto. Furthermore, the brake surface 52 with its axial concave feature 100 may cooperate with the second axial concave surface 110 of the bracing structure 20 so as to be sized and configured to effectively hold a portion of rope 5 having a circular cross-section therebetween and maximize the clutch of the teeth 76 to the rope.

Figure 2B:
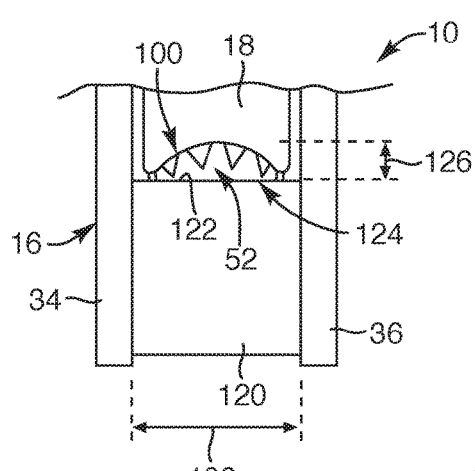
FIG. 2B is a partial top end view of another embodiment of a bracing structure adjacent the brake member of the rope tension device, depicting the bracing structure being fixed with an axially extending flat surface, according to the present invention.

With reference to FIG. 2B, another embodiment of a bracing structure 120 cooperating with the brake member 18 of the rope tension device 10 is provided. This embodiment may be substantially similar to the previous embodiment, except the bracing structure 120 may not include the second axially concave surface. The bracing structure 120 may include an arcuate surface at least positioned adjacent the brake surface 52. In one embodiment, the arcuate surface of the bracing structure 120 may include a cylindrical surface over, for example, an entire periphery of the bracing structure 120 with an axial flat surface 122 extending between the first and second rails 34, 36. As in the previous embodiment, the bracing structure 120 may be fixed to the first and second rails 34, 36 of the frame 16. Similar to the previous embodiment, a gap 124 between the axially flat surface 122 of the bracing structure 120 and the axially concave feature 100 of the brake surface 52 may vary in height 126 along the width 106 between the first and second rails 34, 36 of the frame 16. With this arrangement, the brake surface 52 extending with the axial concave feature 100 effectively receives a portion of rope while the axially flat surface 122 of the bracing structure 120 effectively acts as a brace or support structure to maintain the rope with a tension force, as described in the previous embodiment in FIG. 1A. In another embodiment, the cylindrical surface of the bracing structure 120 may only extend cylindrically over a portion of the bracing structure 120 that is adjacent to the brake surface 52.

Figure 2C:
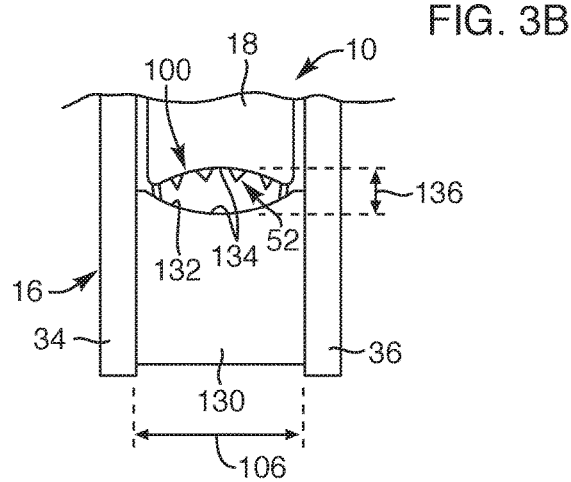
FIG. 2C is a partial top end view of another embodiment of a bracing structure adjacent the brake member of the rope tension device, depicting the bracing structure being fixed with a portion of the bracing structure having an axially extending concave surface, according to another embodiment of the present invention.

With respect to FIG. 2C, another embodiment of a bracing structure 130 cooperating with the brake member 18 of the rope tension device 10 is provided. In this embodiment, the bracing structure 130 may include an arcuate surface adjacent the brake surface 52, the bracing structure 130 defining an axially concave surface 132 extending between the first and second rails 34, 36 over a portion of the bracing structure 130 that is adjacent the brake surface 52. The remaining portion of the bracing structure 130 may include a cylindrical structure or any other suitable structure. In this embodiment, the bracing structure 130 may be a fixed structure, fixed between the first and second rails 34, 36 of the frame 16. Further, the bracing structure 130 may be a monolithic structure relative to the first and second rails 34, 36 of the frame 16. As in the previous embodiments, a gap 134 between the axially concave surface 132 of the bracing structure 130 and the axially concave feature 100 of the brake surface 52 may vary in height 136 along the width 106 between the first and second rails 34, 36 of the frame 16.

Figure 3A:
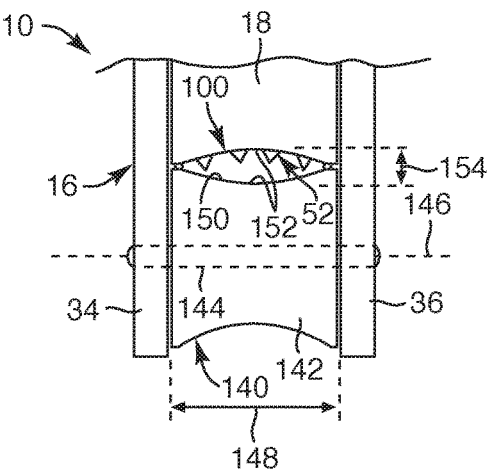
FIG. 3A is a partial top end view of another embodiment of a bracing structure adjacent the brake member of the rope tension device, depicting the bracing structure being rotatable with an axially extending concave surface, according to the present invention.

Now with reference to FIG. 3A, another embodiment of a bracing structure 140 of the rope tension device 10 is provided. In this embodiment, the brake member 18 may be similar to the brake member described relative to the previous embodiments. However, in this embodiment, the bracing structure 140 may be in the form of a roller member 142, the bracing structure 140 (and roller member 142) may define an arcuate surface adjacent the brake surface 52. The roller member 142 may be rotatably coupled to a roller shaft 144 or the like defining a roller axis 146. The roller member 142 may define a radius that varies along a width 148 of the roller member 142. More particularly, the roller member 142 may define an axial concave surface 150 between opposing ends of the roller member 142 or over the width 148 of the roller member such that the roller member 142 exhibits an hour-glass like shape. As in previous embodiments, a gap 152 between the axial concave surface 150 of the roller member 142 and the axial concave feature 100 of the brake surface 52 varies in height 154 along the width 148 between the first and second rails 34, 36 of the rope tension device 10. With this arrangement, the roller member 142 may facilitate the rope to be readily pulled through the gap 152, via rotation of the roller member 142, while immediately maintaining a tension force upon the first portion of the rope with the brake member 18 upon releasing the pulling force on the rope, similar to that depicted and described relative to FIG. 1A. Further, the roller member 142 provides structure to brace and support the rope and to facilitate the brake member 18 to be biased toward the roller member and maintain the rope in a tensioned state therebetween. In one embodiment, the roller member 142 may rotate about the roller axis 146 in both rotational directions or bi-directionally. In another embodiment, the roller member 142 may rotate in a single direction or uni-directionally. For example, the roller member 142 may rotate with the rope as the rope is pulled through the gap 152 and act as a stabilizing structure in cooperation with the brake member 18 to maintain the tension force to the first portion of the rope.

Figure 3B:
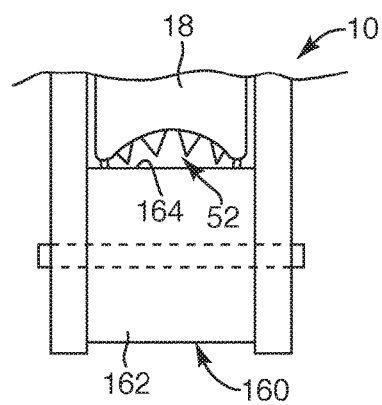
FIG. 3B is a partial top end view of another embodiment of a bracing structure adjacent the brake member of the rope tension device, depicting the bracing structure being rotatable with an axially extending flat surface, according to the present invention.

With respect to FIG. 3B, another embodiment of a bracing structure 160 in cooperation with the brake member 18 of the rope tension device 10 is provided. This embodiment is similar to the previous embodiment, except in this embodiment the bracing structure 160 may be a roller member 162 having a cylindrical structure with an axially extending flat surface 164. As in previous embodiments, the bracing structure 160 defines an arcuate surface positioned adjacent the brake surface 52. Similar to the previous embodiment, the roller member 162 may rotate about an axis bi-directionally or uni-directionally.

Figure 4:
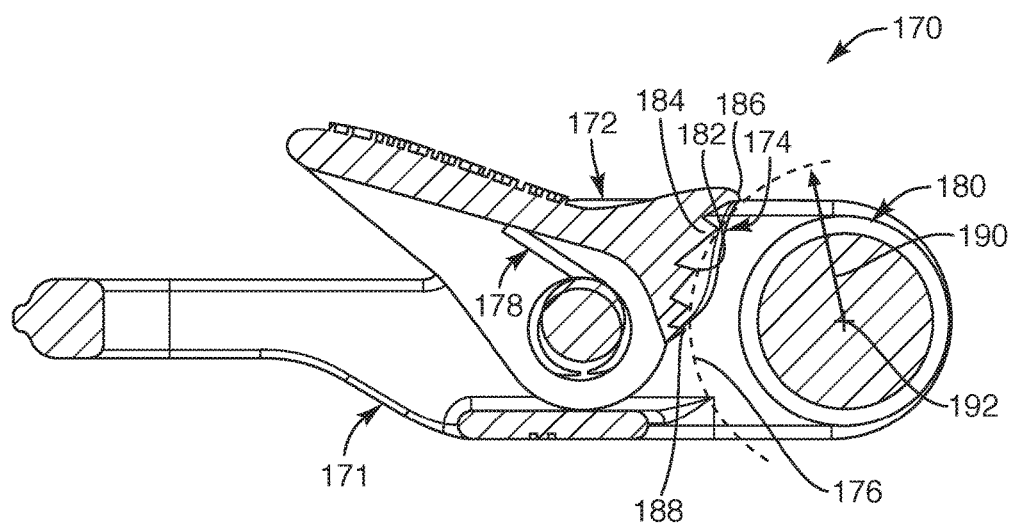
FIG. 4 is a cross-sectional side view, similar to the view of FIG. 1A, of another embodiment of a rope tension device, depicting teeth of a brake surface defining a radial concave profile, according to the present invention.

Now with reference to FIG. 4, another embodiment of a rope tension device 170 is provided. Similar to the rope tension device 10 depicted in FIGS. 1 and 1A, the rope tension device 170 of this embodiment, depicted in FIG. 4, may include a frame 171 with a brake member 172 having a brake surface 174 that defines a radial concave profile 176 or arc, depicted with dotted line, the brake member 172 biased with a spring member 178 toward a bracing structure 180. For simplistic purposes, the brake member 172 is depicted in a suspended position as if positioned/biased toward a rope (not shown) in the gap between the brake surface 174 and the bracing structure 180.

The brake surface 174 may be defined, at least partially, by a profile of the free ends 182 of teeth 184 extending from the brake member 172. In other words, the radial concave profile 176 may be defined by the ends 182 of the teeth 184 such that the ends 182 collectively extend to define the radial concave profile 176. In this manner, the radial concave profile 176 of the teeth 184 may be sized and configured to maximize the number of individual teeth, or rows and/or columns of teeth, that engage the rope. In one embodiment, the radial concave profile 176 may be defined with an arc such the radial concave profile extends in a concave manner between a top end 186 and a bottom end 188 of the brake surface 174. In another embodiment, the radial concave profile 176 may define a radius 190, the radius corresponding to an axis 192 of the bracing structure 180. With this arrangement, the radial concave profile 176 of the brake member 172 may facilitate increased engagement of the teeth 184 with the rope (or a larger region or surface area of the rope being engaged), the rope having a generally circular or semi-circular cross-section. As such, upon positioning a rope between the brake member 172 and the bracing structure 180, the rope tension device 170 may maintain a tension force upon placing a pulling force on the rope, as previously described and depicted relative to FIG. 1A.

Further, in one embodiment, the radial concave profile 176, depicted in FIG. 4, may also extend with the axial concave feature 100, as depicted and described relative to FIG. 2A. Further, the rope tension device 170, with its radial concave profile 176 depicted in FIG. 4, may include a bracing structure 180 similar to any one of the bracing structure embodiments described and depicted relative to FIGS. 2A, 2B, 2C, 3A, and 3B.

Figure 5:
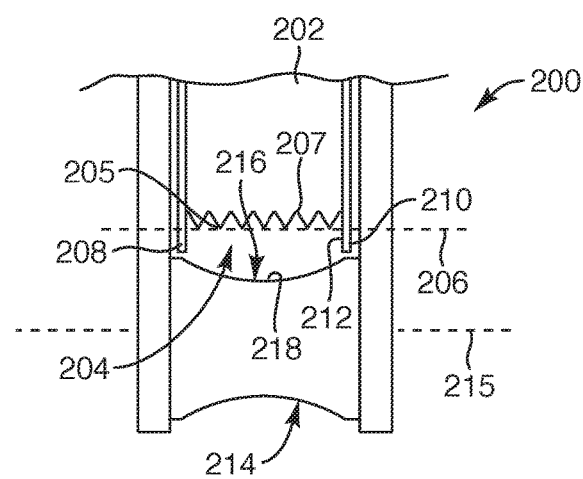
FIG. 5 is a partial top end view of another embodiment of a rope tension device, depicting teeth of a brake surface defining an axial linear profile between peripheral side walls that define a channel portion of the brake surface, according to the present invention.

With respect to FIG. 5, another embodiment of a rope tension device 200 is provided. In this embodiment, the brake member 202 of the rope tension device 200 may include the radial concave profile 176 as described relative to FIG. 4. Further, the brake surface 204 of the brake member 202 may extend axially without a concave feature, but rather, with a generally axially extending linear profile 206, depicted with a dotted line, between first and second peripheral side walls 208, 210 that define a channel portion 212. In other words, an axial profile view of the ends 205 of the teeth 207 may collectively define the generally axially extending linear profile 206 such that the linear profile 206 extends generally parallel relative to the axis 215 of the bracing structure 214. The bracing structure 214 of this embodiment may include an arcuate surface 216 that extends with an axial concave profile or surface 218, similar to previous embodiments.

The portions or components of any one of the rope tension devices set forth herein may be manufactured using various metallic materials, such as, steel, aluminum, copper, titanium, zinc, and/or magnesium or any alloy thereof, such as, Zamak, or any other suitable metallic material known to one of ordinary skill in the art. Likewise, portions or components of any one of the rope tension devices set forth herein may be manufactured and formed using various polymeric materials, such as, nylon, polyvinyl chloride, polystyrene, polyethylene, and/or silicon or composite materials or glass filled polymers or any other suitable polymeric material known to one of ordinary skill in the art. In addition, embodiments of the rope tension device may include a combination of polymeric and metallic materials. Further, in one embodiment, in the case of a fixed bracing structure, the frame and bracing structure may be formed from molds to form a monolithic structure with a polymeric material with, for example, a glass filled polymer, such as, a glass filled nylon. The components of the rope tension device may be formed by employing molding techniques from polymeric or metallic materials as known to one of ordinary skill in the art. Further, the described components herein may also be machined, fabricated and formed from polymeric and metallic materials employing manufacturing techniques and processes as known to one of ordinary skill in the art. Further, the rope tension device may be sized to accommodate various sizes of rope, for example, any one of the rope tension devices set forth herein may be formed to accommodate rope or line having a diameter of about 2 mm as well as sized to accommodate rope up to about one inch, or larger.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. As such, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A rope tension device for cinching a load with a rope, the rope tension device comprising:
    a frame including a first rail and a second rail with a bracing structure extending between the first rail and the second rail, the first rail fixedly positioned relative to the second rail, the bracing structure defining an arcuate surface; and
    a brake member pivotably coupled to the frame, the brake member having a brake surface such that the brake surface is biased with a spring member toward the arcuate surface, the brake surface defining an axially extending concave feature that faces the arcuate surface of the bracing structure;
    wherein a gap between the arcuate surface and the axially extending concave feature varies in height along an axial width defined between the first rail and the second rail.

2. The rope tension device of claim 1, further comprising a rope member having a generally circular cross-section, the rope member configured to extend through the gap between the arcuate surface of the bracing structure and the axially extending concave feature of the brake member.

3. The rope tension device of claim 2, wherein the brake surface comprises multiple rows of teeth extending therefrom such that more than one row of teeth contact the rope member for cinching the load.

4. The rope tension device of claim 1, wherein the axially extending concave feature comprises an axially extending concave surface.

5. The rope tension device of claim 1, wherein the axially extending concave feature comprises multiple teeth in an axial row such that the axially extending concave feature is defined by an outer-most axial profile of ends of the teeth in the axial row.

6. The rope tension device of claim 1, wherein the brake surface comprises multiple teeth extending therefrom, the multiple teeth being canted so as to facilitate the rope to readily move in one direction and to substantially prevent movement of the rope in a second direction.

7. The rope tension device of claim 1, wherein the arcuate surface of the bracing structure defines an axial concave surface.

8. The rope tension device of claim 1, wherein the arcuate surface of the bracing structure defines an axial flat surface and a cylindrical structure.

9. The rope tension device of claim 1, wherein the arcuate surface comprises a textured surface.

10. The rope tension device of claim 1, wherein the bracing structure comprises a roller member configured to rotate.

11. The rope tension device of claim 1, wherein the bracing structure is fixed to the first and second rails of the frame.

12. The rope tension device of claim 1, wherein the brake member comprises a channel portion for receiving the rope, the channel portion defined by first and second peripheral side walls with the brake surface defined therebetween and teeth extending from the brake surface.

13. The rope tension device of claim 1, wherein the brake surface extends with a radial concave profile between a top end and a bottom end of the brake surface, the radial concave profile defining a radius relative to an axis of the bracing structure.

14. A rope tension device, comprising:
    a frame including a first rail and a second rail, the first rail fixedly positioned relative to the second rail;

a bracing structure positioned between the first rail and the second rail at an end portion of the frame, the bracing structure defining an arcuate surface;

a brake member pivotably coupled to the frame, the brake member having a brake surface such that the brake surface is biased with a spring member toward the arcuate surface of the bracing structure, the brake member including a channel portion defined by first and second peripheral side walls and the brake surface between the side walls, the brake surface including teeth extending therefrom and extending toward the arcuate surface of the bracing structure.

15. The rope tension device of claim 14, wherein the brake surface and the arcuate surface define a gap therebetween such that the gap defines a height that varies along an axial width between the first rail and the second rail.

16. The rope tension device of claim 14, further comprising a rope having a generally circular cross-section, the rope configured to be positioned along the channel portion and between the brake surface and the arcuate surface of the bracing structure.

17. The rope tension device of claim 14, wherein the brake surface comprises an axially extending concave feature.

18. The rope tension device of claim 14, wherein the arcuate surface of the bracing structure comprises an axially extending concave surface.

19. The rope tension device of claim 14, wherein the arcuate surface of the bracing structure comprises an axially extending flat surface.

20. The rope tension device of claim 14, wherein the bracing structure comprises a roller member configured to rotate.

21. The rope tension device of claim 14, wherein the brake surface extends with a radial concave profile between a top end and a bottom end of the brake surface, the radial concave profile defining a radius relative to an axis of the bracing structure.

22. The rope tension device of claim 21, wherein the brake member includes first and second peripheral side walls extending toward the bracing structure to define a channel portion.

23. A method for providing tension in a rope, the method comprising:

coupling a first portion of the rope to an object;

extending the rope through a gap defined between a brake member and a bracing structure coupled to a frame of a rope tension device such that the gap varies in height along an axial width between first and second rails of the frame, the first rail fixedly positioned relative to the second rail, the brake member pivotably coupled to the frame of the rope tension device and biased toward the bracing structure with a spring member;

pulling a second portion of the rope with a pulling force from an upper side of the frame to place a tension force on the first portion of the rope extending from a bottom side of the frame; and maintaining the tension force in the first portion of the rope with teeth extending from a brake surface biased against the rope and toward the bracing structure.

24. The method according to claim 23, wherein the extending the rope through the gap comprises extending the rope through the gap such that the brake surface defines an axially extending concave feature.

25. The method according to claim 23, wherein the extending the rope through the gap comprises extending the rope through the gap such that the brake member defines a channel portion defined by first and second peripheral side walls with the brake surface therebetween.

26. The method according to claim 23, wherein the extending the rope through the gap comprises extending the rope through the gap such that the bracing structure defines an arcuate surface facing the brake surface, the arcuate surface comprising at least one of an axially extending concave surface and an axially extending flat surface.

27. The method according to claim 23, wherein the extending the rope through the gap comprises extending the rope through the gap such that the brake surface defines a radial concave profile between a top end and a bottom end of the brake surface, the radial concave profile defining a radius relative to an axis of the bracing structure.

28. A rope tension device, comprising:

a frame including a first rail and a second rail, the first rail fixedly positioned relative to the second rail;

a bracing structure positioned between the first rail and the second rail at an end portion of the frame, the bracing structure defining an arcuate surface;

a brake member pivotably coupled to the frame, the brake member having a brake surface such that the brake surface is biased with a spring member toward the arcuate surface of the bracing structure, the brake surface including teeth extending therefrom and extending toward the arcuate surface of the bracing structure, the brake surface defining a concave feature such that a gap between the arcuate surface and the concave feature varies in height along an axial width defined between the first rail and the second rail.

29. The rope tension device of claim 28, wherein the concave feature of the brake surface comprises a radial concave profile defined between a top end and a bottom end of the brake surface, the radial concave profile defined by a radius relative to an axis of the bracing structure.

30. The rope tension device of claim 29, wherein the radial concave profile extends axially in a generally linear manner.

31. The rope tension device of claim 30, wherein the arcuate surface of the bracing structure comprises an axially extending concave surface.

32. The rope tension device of claim 29, wherein the radial concave profile extends axially with an axial concave profile.

33. The rope tension device of claim 28, wherein the concave feature of the brake surface comprises an axially extending concave profile.

34. The rope tension device of claim 33, wherein the arcuate surface of the bracing structure extends axially with at least one of a concave profile and a flat profile.

* * * * *